(12) United States Patent
Lee et al.

(10) Patent No.: US 9,692,034 B2
(45) Date of Patent: Jun. 27, 2017

(54) SECONDARY BATTERY

(71) Applicant: SAMSUNG SDI CO., LTD., Yongin-si, Gyeonggi-do (KR)

(72) Inventors: Hyunsoo Lee, Yongin-si (KR); Janghyun Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 254 days.

(21) Appl. No.: 14/502,356

(22) Filed: Sep. 30, 2014

(65) Prior Publication Data

US 2015/0214536 A1    Jul. 30, 2015

(30) Foreign Application Priority Data

Jan. 28, 2014 (KR) ........................ 10-2014-0010715

(51) Int. Cl.
| | |
|---|---|
| H01M 2/00 | (2006.01) |
| H01M 2/30 | (2006.01) |
| H01M 2/22 | (2006.01) |
| H01M 2/02 | (2006.01) |

(52) U.S. Cl.
CPC ............ *H01M 2/30* (2013.01); *H01M 2/021* (2013.01); *H01M 2/024* (2013.01); *H01M 2/22* (2013.01)

(58) Field of Classification Search
CPC .......... H01M 2/30; H01M 2/22; H01M 2/021; H01M 2/024
USPC ........................................ 429/163, 164, 187
See application file for complete search history.

(56) References Cited

U.S. PATENT DOCUMENTS

| | | | |
|---|---|---|---|
| 2011/0300419 A1* | 12/2011 | Byun | ...................... H01M 2/22 429/61 |
| 2012/0148911 A1 | 6/2012 | Suzuki et al. | |
| 2014/0106205 A1 | 4/2014 | Lee et al. | |

FOREIGN PATENT DOCUMENTS

| | | |
|---|---|---|
| EP | 2 388 844 A1 | 11/2011 |
| EP | 2 535 967 A1 | 12/2012 |
| JP | 2009-277604 | 11/2009 |
| JP | 2014-006975 | 1/2014 |
| KR | 10-2011-0127621 | 11/2011 |
| KR | 10-2012-0089789 | 8/2012 |

OTHER PUBLICATIONS

English machine translation of Japanese Publication No. JP 2009-277604, dated Nov. 26, 2009, 19 pages.
EPO Search Report dated Feb. 4, 2015, for corresponding European Patent application 14193679.9, (6 pages).

* cited by examiner

*Primary Examiner* — Helen O Conley
(74) *Attorney, Agent, or Firm* — Lewis Roca Rothgerber Christie LLP (57) ABSTRACT

A secondary battery includes an electrode assembly comprising a first electrode plate, a second electrode plate and a separator located between the first electrode plate and the second electrode plate; a case accommodating the electrode assembly; a cap plate sealing the case; a first collector plate comprising a first vertical part electrically connected to the first electrode plate, a first horizontal part bent from the first vertical part and extending between the electrode assembly and the cap plate, and a first protrusion protruding from the first horizontal part; and a first electrode terminal electrically connected to the first collector plate and extending through the cap plate, wherein the first electrode terminal has a coupling opening engaged with the first protrusion.

12 Claims, 6 Drawing Sheets

SECONDARY BATTERY

CROSS-REFERENCE TO RELATED APPLICATION

This application claims priority to and the benefit of Korean Patent Application No. 10-2014-0010715 filed in the Korean Intellectual Property Office on Jan. 28, 2014, the entire content of which is incorporated herein by reference.

BACKGROUND

1. Field

Embodiments relate to a secondary battery.

2. Description of the Related Art

Generally, secondary batteries can be discharged and recharged, unlike primary batteries, which are not rechargeable. Secondary batteries may be of a low capacity type, which includes battery cells in the form of a pack typically used for small portable electronic devices such as cellular phones and camcorders, or a high capacity type, which includes battery cells used as a motor-driving power source and having several battery cells connected to one another and widely used as a power source for hybrid vehicles, etc.

Secondary batteries may be manufactured in various shapes, such as cylindrical shape or prismatic shapes. A typical secondary battery may include an electrode assembly having a positive plate and a negative plate with a separator acting as an insulator between the positive and negative plates accommodated in a battery case with an electrolyte, and a cap assembly having electrode terminals coupled to the case. The electrode assembly is electrically connected to the electrode terminal through a current collector. In that case, a volume of the case may vary according to the connection structure of the current collector and the electrode terminal. Therefore, it is necessary to manufacture a secondary battery capable of implementing a higher capacity in a given volume.

SUMMARY

Embodiments are directed to a secondary battery, which represents and advance in the related art.

It is a feature of an embodiment to provide a secondary battery, which can increase a capacity of an electrode assembly in a given volume and can improve the reliability.

At least one of the above and other features and advantages may be realized by providing a secondary battery includes an electrode assembly including a first electrode plate, a second electrode plate and a separator interposed between the first electrode plate and the second electrode plate, a case accommodating the electrode assembly, a cap plate sealing the case, a first collector plate including a first vertical part electrically connected to the first electrode plate, a first horizontal part bent from an end of the first vertical part, horizontally extending and formed between the electrode assembly and the cap plate, and a first protrusion protruding from the first horizontal part, and a first electrode terminal electrically connected to the first collector plate and formed to pass through the cap plate, wherein a coupling opening engaged with the first protrusion is formed in the first electrode terminal.

After the first protrusion is engaged with the coupling opening, it may be fixed to the first electrode terminal by caulking.

The first protrusion may protrude toward the electrode assembly from a bottom surface of the first horizontal part.

The first protrusion may be parallel to the first vertical part.

The first electrode terminal may include a first terminal body passing through the cap plate, and a first terminal extension part horizontally extending from a lower portion of the first terminal body.

A stepped part being thinner than the first terminal extension part may be formed at one side of the first terminal extension part, and the coupling opening may be formed in the stepped part.

The first horizontal part may be coupled to the stepped part.

The first horizontal part may be coupled to the stepped part by laser welding.

A sum of a thickness of the first horizontal part and a thickness of the stepped part may be equal to a thickness of the first terminal extension part.

The secondary battery may further include a terminal plate coupled to the first terminal body, and a top portion of the first terminal body is riveted to be fixed to the terminal plate.

The secondary battery may further include a second collector plate including a second vertical part electrically connected to the second electrode plate, a second horizontal part bent from an end of the second vertical part, horizontally extending and formed between the electrode assembly and the cap plate, and a second protrusion protruding from the second horizontal part, and a second electrode terminal electrically connected to the second collector plate and formed to pass through the cap plate, wherein a coupling opening engaged with the second protrusion is formed in the second electrode terminal.

After the second protrusion is engaged with the coupling opening, it may be fixed to the second electrode terminal by caulking.

The second protrusion may protrude toward the electrode assembly from a bottom surface of the second horizontal part.

The second protrusion may be parallel to the second vertical part.

As described above, the secondary battery according to the embodiment of the present invention includes a collector plate having a protrusion, and an electrode terminal having a coupling opening engaged with the protrusion, thereby simplifying a coupling structure of the collector plate and the electrode terminal. Accordingly, the secondary battery according to the embodiment of the present invention may reduce a volume occupied by the collector plate and the electrode terminal within the case, thereby increasing the capacity of the electrode assembly in a given volume.

In addition, in the secondary battery according to the embodiment of the present invention, the collector plate and the electrode terminal are coupled to each other by laser welding and the protrusion and the coupling opening are engaged with each other to then be further coupled to each other by caulking, thereby coupling and fixing the collector plate and the electrode terminal in a more secured manner. Accordingly, the reliability of the secondary battery can be improved.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments of the present invention will now be described in more detail with reference to accompanying drawings, such that those skilled in the art can easily practice the present invention.

Figure 1:
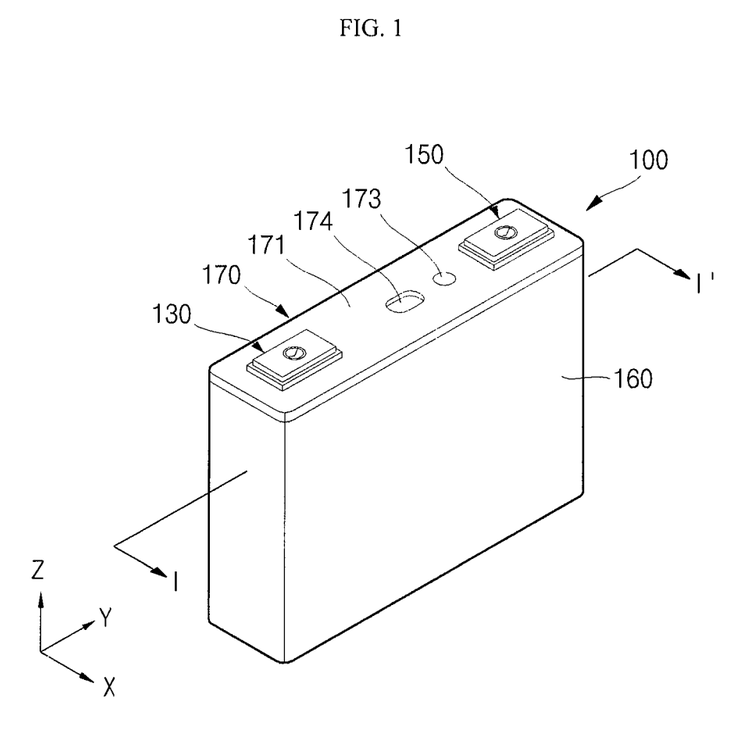
FIG. 1 is a perspective view of a secondary battery according to an embodiment of the present invention.
Figure 2:
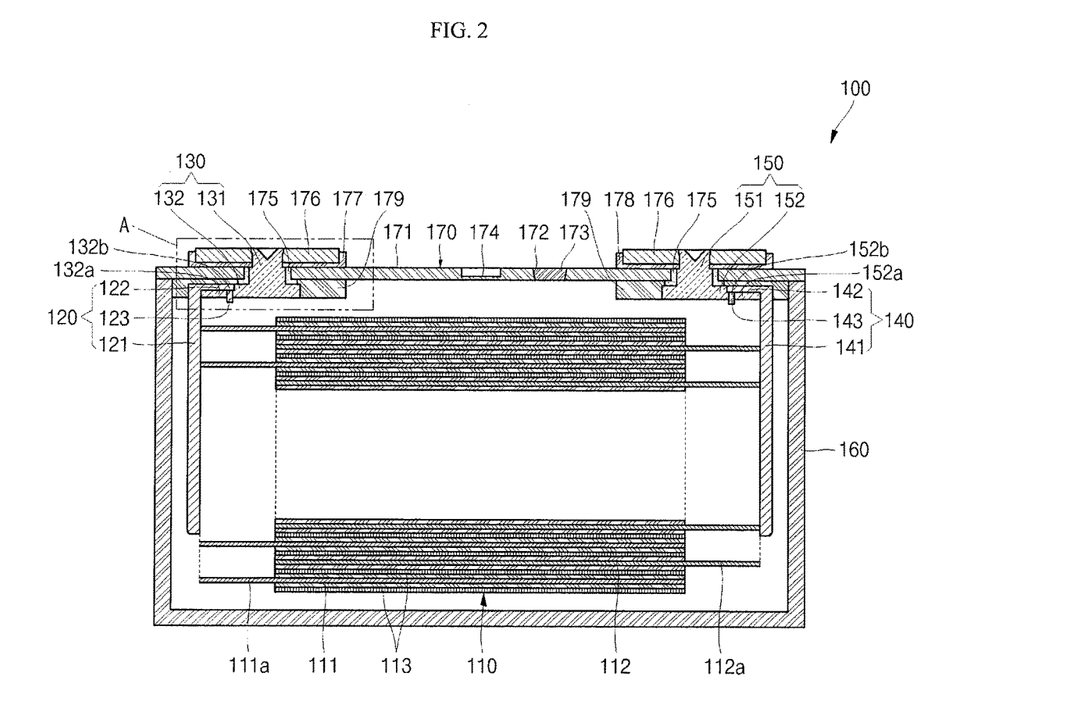
FIG. 2 is a cross-sectional view taken along the line I-I' of FIG. 2.
Figure 3:
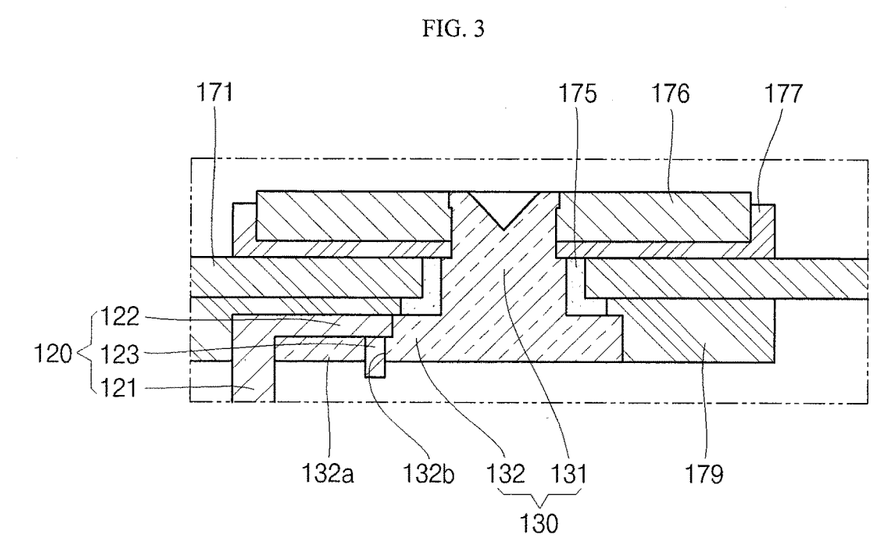
FIG. 3 is an enlarged cross-sectional view illustrating a portion 'A' of FIG. 2.
Figure 4A:
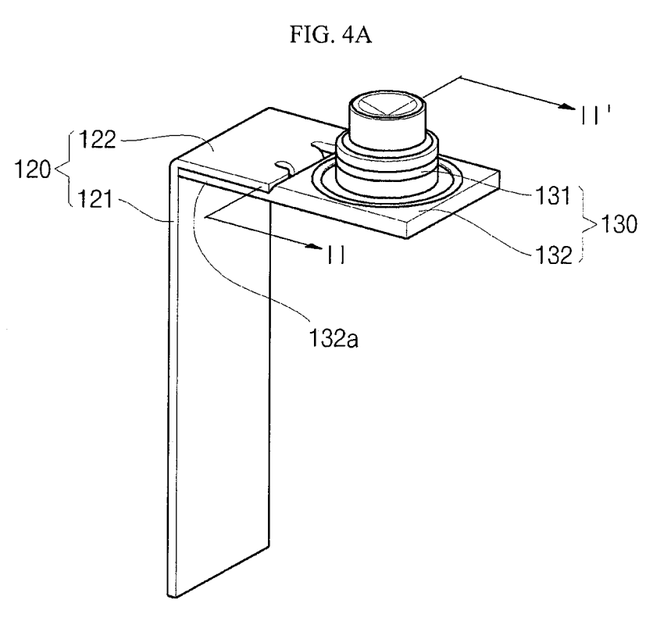
FIGS. 4A and 4B are perspective views illustrating a state in which a first collector plate and a first electrode terminal are connected to each other.
Figure 4B:
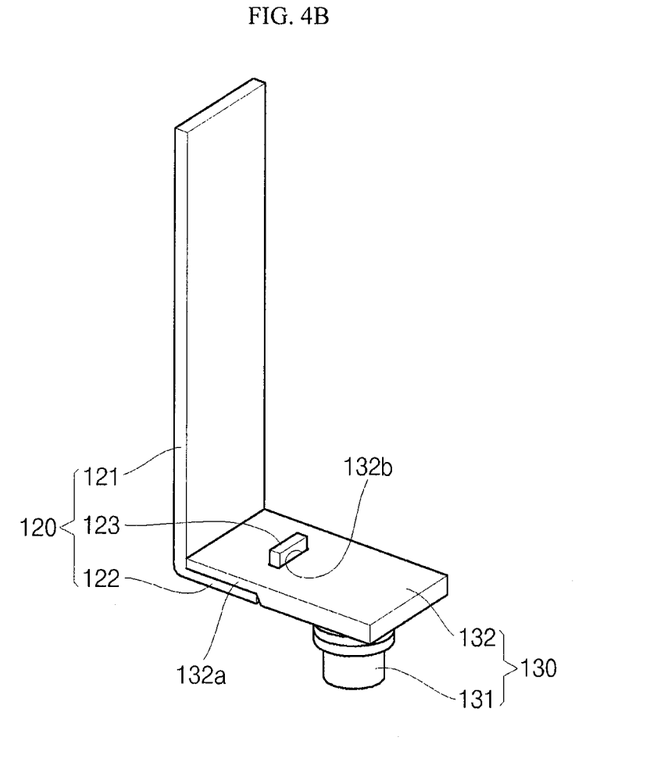
Figure 5:
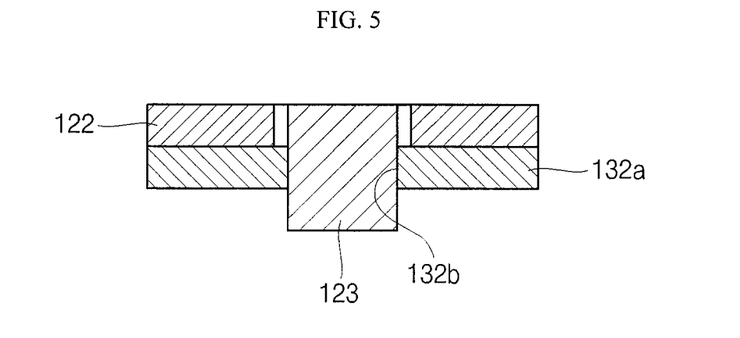
FIG. 5 is a cross-sectional view taken along the line II-II' of FIG. 4A.

FIG. 1 is a perspective view of a secondary battery according to an embodiment of the present invention, FIG. 2 is a cross-sectional view taken along the line I-I' of FIG. 2, FIG. 3 is an enlarged cross-sectional view illustrating a portion 'A' of FIG. 2, FIGS. 4A and 4B are perspective views illustrating a state in which a first collector plate and a first electrode terminal are connected to each other, and FIG. 5 is a cross-sectional view taken along the line II-II' of FIG. 4A.

Referring to FIGS. 1 to 5, the secondary battery 100 according to an embodiment of the present invention includes an electrode assembly 110, a first collector plate 120, a first electrode terminal 130, a second collector plate 140, a second electrode terminal 150, a case 160 and a cap assembly 170.

The first electrode assembly 110 includes a wound or laminated stacked structure having a first electrode plate 111, a first separator 113, and a second electrode plate 112, and, may be a thin plate or a thin foil shape.

The first electrode plate 111 may include a first electrode collector formed of a metal foil made of, for example, aluminum (Al), and a first electrode active material, such as, a transition metal oxide, on the first electrode collector. In addition, the first electrode plate 111 may include a first electrode uncoated portion 111a where the first electrode active material is not applied. The first electrode uncoated portion 111a may function as a passage for current flowing between the first electrode plate 111 and an exterior of the first electrode plate 111.

The second electrode plate 112 may include a second electrode collector formed of a metal foil made of, for example, copper (Cu) or nickel (Ni), and a second electrode active material, such as, graphite or carbon, on the second electrode collector. In addition, the second electrode plate 112 may include a second electrode uncoated portion 112a where the second electrode active material is not applied. The second electrode uncoated portion 112a may function as a passage for current flowing between the second electrode plate 112 and an exterior of the second electrode plate 112.

The first separator 113 may be positioned between the first electrode plate 111 and the second electrode plate 112 to prevent electrical short circuits and to allow movement of lithium ions. The first separator 113 according to this embodiment may be made of a material selected from the group consisting of polyethylene, polypropylene, or a copolymer of polypropylene and polyethylene.

The first electrode assembly 110 and the second electrode assembly 120 are accommodated in the case 160 with an electrolyte. The electrolyte may include an organic solvent, such as EC, PC, DEC, EMC, or DMC, and a lithium salt, such as $LiPF_6$, or $LiBF_4$. In addition, the electrolyte may be in a liquid, solid or gel phase.

The first collector plate 120 is made of a conductive material, such as aluminum, and is coupled to the first electrode uncoated portion 111a protruding from one end of the first electrode assembly 110 to be electrically connected to the first electrode plate 111. The first collector plate 120 includes a first vertical part 121, a first horizontal part 122 and a first protrusion 123. As used herein, the terms "vertical" and "horizontal" are relative descriptors that are based on the orientation of the battery as shown in FIG. 2 and describe a generally perpendicular relationship between the components. It will be appreciated that such descriptors apply even when in a particular orientation of the battery, they may not extend in the "vertical" or "horizontal" direction.

The first vertical part 121 is formed at one side of the first electrode assembly 110 and is coupled to the first electrode uncoated portion 111a. In one embodiment, the first vertical part 121 may be welded to the first electrode uncoated portion 111a. The first vertical part 121 is formed to be perpendicular to the cap plate 171 of the cap assembly 170 and to be parallel to a side surface of the case 160.

The first horizontal part 122 is bent and extends from an end of the first vertical part 121. The first horizontal part 122 extends horizontally parallel to the first vertical part 121. In addition, the first horizontal part 122 is installed between a top portion of the electrode assembly 110 and a bottom portion of the cap plate 171. In other words, the first horizontal part 122 is formed to be parallel to the cap plate 171. In addition, the first horizontal part 122 is coupled to the first electrode terminal 130. In one embodiment, the first horizontal part 122 may be coupled to the first electrode terminal 130 by laser welding. In addition, a first protrusion 123 is formed at a bottom portion of the first horizontal part 122.

The first protrusion 123 protrudes from the first horizontal part 122. In detail, the first protrusion 123 is formed on a bottom surface of the first horizontal part 122 and protrudes toward the electrode assembly 110 from the bottom surface of the first horizontal part 122. Therefore, the first protrusion 123 is formed to be parallel to the first vertical part 121. The first protrusion 123 may couple the first collector plate 120 to the first electrode terminal 130. The first protrusion 123 is coupled to a coupling opening 132b of the first electrode terminal 130. In one embodiment, after the first protrusion 123 is coupled to the coupling opening 132b of the first electrode terminal 130, it may be fixed to the first electrode terminal 130 by caulking. In the illustrated embodiment, one first protrusion 123 is exemplified, but aspects of the present invention are not limited thereto. In other words, a plurality of first protrusions 123 may be provided.

The first electrode terminal 130 is made of a conductive material, such as aluminum, and is coupled to the first collector plate 120 to be electrically connected to the first electrode plate 111. The first electrode terminal 130 includes a first terminal body 131 and a first terminal extension part 132.

The first terminal body 131 passes through the cap plate 171 and has a top portion riveted to be fixed to the cap plate 171.

The first terminal extension part 132 horizontally extends from the bottom portion of the first terminal body 131 to then make close contact with or to be close to the bottom surface of the cap plate 171. A stepped part 132a being thinner than the first terminal extension part 132 is formed at one side of the first terminal extension part 132. The first horizontal part 122 of the first collector plate 120 is coupled to the stepped part 132a. In one embodiment, a sum of the thickness of the stepped part 132a and the thickness of the first horizontal part 122 is equal to the thickness of the first terminal extension part 132. In addition, a coupling opening 132b is formed at a location of the stepped part 132a, corresponding to the first protrusion 123. In one embodiment, each coupling opening 132b may be shaped to correspond to a respective first protrusion 123. For example, if two first protrusions 123 are formed, two coupling openings 132b may be formed accordingly. In addition, when the first horizontal part 122 is coupled to the stepped part 132a, the first protrusion 123 formed on the bottom surface of the first horizontal part 122 is coupled to the coupling opening 132b formed on the stepped part 132a. In addition, the first horizontal part 122 and the stepped part 132a are coupled to each other by laser welding, the first protrusion 123 is fitted into the coupling opening 132b, and the first protrusion 123 is then fixed to the stepped part 132 by caulking. Therefore, the first collector plate 120 and the first electrode terminal 130 are firmly coupled to each other.

The second collector plate 140 may be made of a conductive material, such as nickel, and is coupled to the second electrode uncoated portion 112a protruding from the other end of the first electrode assembly 110 to then be electrically connected to the second electrode plate 112. The second collector plate 140 includes a second vertical part 141, a second horizontal part 142 and a second protrusion 143.

The second vertical part 141, the second horizontal part 142 and the second protrusion 143 of the second collector plate 140 may have the same configurations and functions with the first vertical part 121, the first horizontal part 122 and the first protrusion 123 of the first collector plate 120, and repeated explanations will be omitted.

The second electrode terminal 150 may be made of a conductive material, such as nickel, and is coupled to the second collector plate 140 to then be electrically connected to the second electrode plate 112. The second electrode terminal 150 includes a second terminal body 151 and a second terminal extension part 152. In addition, a stepped part 152a being thinner than the second terminal extension part 152 is formed at one side of the second terminal extension part 152 and a coupling opening 152b engaged with the second protrusion 143 is formed in the stepped part 152a.

In addition, the second terminal body 151 and the second terminal extension part 152 of the second electrode terminal 150 have the same configurations and functions with the first terminal body 131 and the first terminal extension part 132 of the first electrode terminal 130, and repeated explanations will be omitted.

The case 160 is made of a conductive metal, such as aluminum, an aluminum alloy, or nickel-plated steel, The case 160 may have an approximately hexahedral shape with an opening so that the electrode assembly 110, a first collector plate 120, a first electrode terminal 130, a second collector plate 140 and a second electrode terminal 150 can be inserted and placed in the case 160. In FIG. 2, the case 160 and the cap assembly 170 assembled to each other are illustrated. As will be appreciated, the opening is a substantially opened part of the case extending along a peripheral edge of the cap assembly 170. The case 160 may have a polarity. For example, the case 160 may function as a positive electrode.

The cap assembly 170 is coupled to the case 160. In detail, the cap assembly 170 includes a cap plate 171, an electrolyte injection opening 172, a plug 173, a safety vent 174, a gasket 175, a terminal plate 176, a connection member 177, an upper insulation member 178 and a lower insulation member 179.

The cap plate 171 may seal the opening of the case 160 and may be formed using the same material with the case 160. The cap plate 171 may be coupled to the case 160 by, for example, laser welding. In one embodiment, the cap plate 171 may have the same polarity as the case 160.

The electrolyte injection hole 172 is formed in the cap plate 171, and an electrolyte is injected through the electrolyte injection hole 172. The plug 173 seals the electrolyte injection hole 172.

The safety vent 174 is formed in the cap plate 171 and is thinner than the cap plate 171 so that it may be opened at a preset pressure.

The gasket 175 is made of an insulating material and is formed between each of the first electrode terminal 130 and the second electrode terminal 150 and the cap plate 171 to seal a space between each of the first electrode terminal 130 and the second electrode terminal 150 and the cap plate 171. The gasket 175 may prevent external moisture from infiltrating into the secondary battery 100 or the electrolyte accommodated within the secondary battery 100 from flowing out from the secondary battery 100.

The terminal plate 176 is coupled to each of the first electrode terminal 130 and the second electrode terminal 150. In addition, after the terminal plate 176 is coupled to each of the first electrode terminal 130 and the second electrode terminal 150, upper portions of the first electrode terminal 130 and the second electrode terminal 150 are riveted, so that the first electrode terminal 130 and the second electrode terminal 150 are fixed to the terminal plate 176.

The connection member 177 is positioned between the terminal plate 176 and the cap plate 171 and is formed to allow the first electrode terminal 130 to be fitted thereto. The connection member 177 makes close contact with the cap plate 171 and the gasket 175 through the terminal plate 175. The connection member 177 electrically connects the first electrode terminal 130 and the cap plate 171 to each other.

The upper insulation member 178 is positioned between the terminal plate 176 and the cap plate 171 and is formed to allow the second electrode terminal 150 to be fitted thereto. The upper insulation member 178 makes close contact with the cap plate 171 and the gasket 175 through the terminal plate 175. The upper insulation member 178 insulates the second electrode terminal 150 and the cap plate 171 from each other.

The lower insulation member 179 is formed between each of the first collector plate 120 and the second collector plate 140 and the cap plate 171 and prevents unnecessary short circuits from occurring. In detail, the lower insulation member 179 is formed between the first horizontal part 122 of the first collector plate 120 and the cap plate 171. In addition, the lower insulation member 179 is formed between the second horizontal part 142 of the second collector plate 140 and the cap plate 171.

As described above, the secondary battery 100 according to an embodiment of the present invention includes the first collector plate 120 having the first protrusion 123 and the first electrode terminal 130 having the coupling opening 132b engaged with the first protrusion 123, thereby simplifying a connection structure of the first collector plate 120 and the first electrode terminal 130. Therefore, the secondary battery 100 according to an embodiment of the present invention can reduce a volume occupied by the first collector plate 120 and the first electrode terminal 130 in the case 160, thereby increasing the capacity of the electrode assembly 110 in a given volume.

In addition, in the secondary battery 100 according to the embodiment of the present invention, the first collector plate 120 and the first electrode terminal 130 are coupled to each other by laser welding and the first protrusion 123 and the coupling opening 132b are engaged with each other to then be further coupled to each other by caulking, thereby coupling and fixing the first collector plate 120 and the first electrode terminal 130 in a more secured manner. Therefore, the secondary battery 100 according to an embodiment of the present invention may have improved reliability.

While the secondary battery of the invention has been described in connection with a certain exemplary embodiment, it will be understood by those skilled in the art that the invention is not limited to the disclosed embodiments, but rather is intended to cover various modifications included within the spirit and scope of the appended claims and equivalents thereof.

What is claimed is:

1. A secondary battery comprising:
    an electrode assembly comprising a first electrode plate, a second electrode plate and a separator located between the first electrode plate and the second electrode plate;
    a case accommodating the electrode assembly;
    a cap plate sealing the case;
    a first collector plate comprising a first vertical part electrically connected to the first electrode plate, a first horizontal part bent from the first vertical part and extending between the electrode assembly and the cap plate, and a first protrusion protruding towards the electrode assembly from the first horizontal part; and
    a first electrode terminal electrically connected to the first collector plate and extending through the cap plate, the first electrode terminal having a body exposed from the cap plate and an extension part extending away from the body,
    wherein the extension part has a coupling opening accommodating the first protrusion and wherein the first vertical part, the first horizontal part and the first protrusion directly contact the extension part,
    wherein the first electrode terminal comprises:
    a first terminal body passing through the cap plate; and
    a first terminal extension part extending perpendicularly from a lower portion of the first terminal body and located below the first horizontal part of a first collector plate.

2. The secondary battery as claimed in claim 1, wherein the first protrusion is fixed to the first electrode terminal by caulking.

3. The secondary battery as claimed in claim 1, wherein the first protrusion is parallel to the first vertical part.

4. The secondary battery as claimed in claim 1, wherein a stepped part being thinner than the first terminal extension part is at one side of the first terminal extension part, and wherein the coupling opening is in the stepped part.

5. The secondary battery as claimed in claim 4, wherein the first horizontal part is coupled to the stepped part.

6. The secondary battery as claimed in claim 4, wherein the first horizontal part is coupled to the stepped part by laser welding.

7. The secondary battery as claimed in claim 4, wherein a sum of a thickness of the first horizontal part and a thickness of the stepped part is equal to a thickness of the first terminal extension part.

8. The secondary battery as claimed in claim 1, further comprising a terminal plate coupled to the first terminal body, and wherein a top portion of the first terminal body is riveted to be fixed to the terminal plate.

9. The secondary battery as claimed in claim 1, further comprising:
    a second collector plate including a second vertical part electrically connected to the second electrode plate, a second horizontal part bent from the second vertical part and extending between the electrode assembly and the cap plate, and a second protrusion protruding from the second horizontal part; and
    a second electrode terminal electrically connected to the second collector plate and extending through the cap plate,
    wherein the second electrode terminal has a coupling opening engaged with the second protrusion.

10. The secondary battery as claimed in claim 9, wherein the second protrusion is fixed to the second electrode terminal by caulking.

11. The secondary battery as claimed in claim 9, wherein the second protrusion protrudes toward the electrode assembly from a bottom surface of the second horizontal part.

12. The secondary battery as claimed in claim 9, wherein the second protrusion is parallel to the second vertical part.

* * * * *